United States Patent [19]

Stief

[11] 4,364,635
[45] Dec. 21, 1982

[54] SLIDE-SCREEN FOR BACK PROJECTION

[76] Inventor: Horst Stief, 13, Gerhart-Hauptmann Strasse, D-4800 Bielefeld 1, Fed. Rep. of Germany

[21] Appl. No.: 272,843

[22] Filed: Jun. 12, 1981

[30] Foreign Application Priority Data

Jun. 13, 1980 [DE] Fed. Rep. of Germany ... 8015655[U]

[51] Int. Cl.$^3$ .............................................. G03B 21/56
[52] U.S. Cl. ................................................... 350/125
[58] Field of Search ................ 350/117, 123, 124, 125

[56] References Cited

U.S. PATENT DOCUMENTS

| | | | |
|---|---|---|---|
| 2,685,817 | 8/1954 | Freeman | 350/124 |
| 2,730,011 | 1/1956 | Kleinhample et al. | 350/124 X |
| 3,720,455 | 3/1973 | Sahlin | 350/117 |
| 3,951,518 | 4/1976 | Kobayashi et al. | 350/117 |
| 3,998,522 | 12/1976 | Holzel | 350/125 |
| 4,022,522 | 5/1977 | Rain | 350/125 X |
| 4,083,626 | 4/1978 | Miyahara et al. | 350/117 |
| 4,089,587 | 5/1978 | Schudel | 350/125 |

FOREIGN PATENT DOCUMENTS

| | | | |
|---|---|---|---|
| 112065 | 10/1944 | Sweden | 350/125 |
| 104711 | 3/1917 | United Kingdom | 350/117 |
| 550000 | 12/1942 | United Kingdom | 350/125 |
| 805216 | 12/1958 | United Kingdom | 350/117 |

*Primary Examiner*—Richard A. Wintercorn
*Attorney, Agent, or Firm*—William A. Drucker

[57] ABSTRACT

A slide-screen for back projection has a standing and/or suspended frame (1) and a projection surface arranged within it. The projection surface is made double-skinned and consists of a plastics or similar translucent partition (3), which allows through light rays (5) coming from a reflector (4), and a natural or synthetic glass viewing screen (2) which reflects the impinging light rays (5) in the direction of the translucent partition (3) preventing dissipation of the light.

16 Claims, 4 Drawing Figures

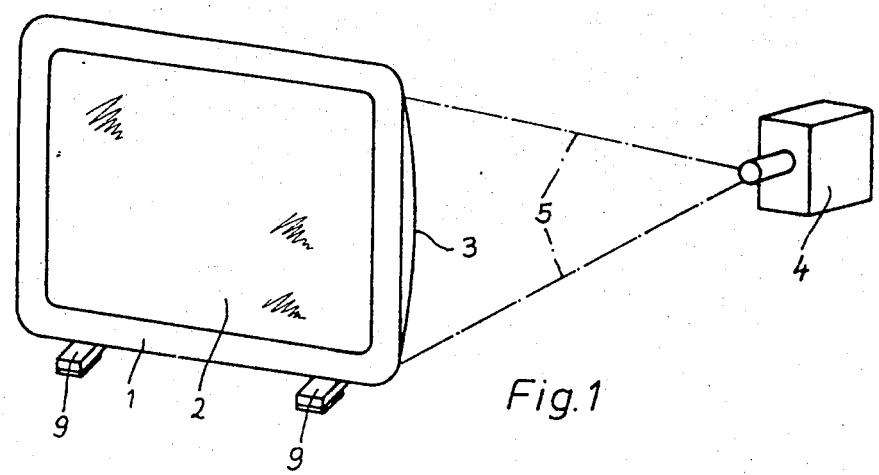
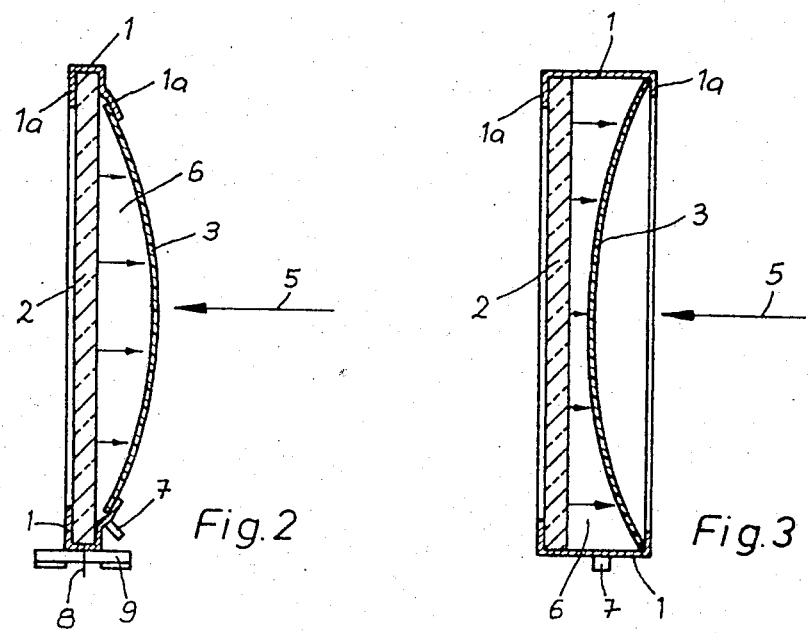
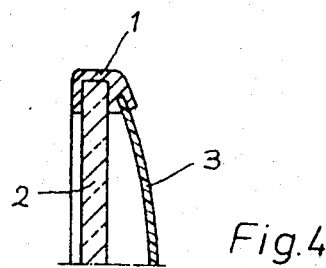

SLIDE-SCREEN FOR BACK PROJECTION

BACKGROUND OF THE INVENTION

The invention relates to a slide-screen, for back projection which consists of a standing and/or suspended frame and a projection surface arranged within it.

THE PRIOR ART

In slide-screens of this type, which have become familiar in practice, the projection surfaces consist of single-skin, rollable or naturally rigid plastics foils or sheets, which are designed for back projection in darkened or undarkened rooms. What is disadvantageous here is that dissipation of light during projection cannot be prevented and consequently the optimum picture cannot be achieved.

OBJECT OF THE INVENTION

The object of the invention is therefore to provide an improved slide-screen, of the type referred to above, wherein dissipation of light is prevented by means of a simple and low-price structure of the projection surface, so that consequently the projected picture is optimum.

SUMMARY OF THE INVENTION

This problem is resolved, according to the invention, by the structure recited in the characterising clause section of claim 1 of the appended claims, features quoted in the appended sub-claims representing technically advantageous extensions of the solution to the problem. The invention covers not only the specifications of the individual claims, but also their combination.

The slide-screen according to the invention is expediently provided with a double-skinned projection surface forming a viewing screen made of natural or synthetic glass and a curved foil or sheet-like translucent partition, the light rays which penetrate the translucent partition impinging on the viewing screen, the excess light being reflected to the translucent partition, so that this residual light is also accumulated in the image, as a result of which no dissipation of light occurs and an optimum picture is produced on the viewing screen.

By means of the panoramic translucent partition, the reflected residual light is evenly accumulated over the whole picture, and the viewing screen shows a perfectly illuminated image.

The double-skinned projection surface is simple and cheap to produce, and can be produced in different sizes without great extra cost. Despite the double-skinned design of the projection surface, the slide-screen according to the invention is small in depth and can be put away in a space-saving manner.

The slide-screen looks like a television screen.

It is possible to project expediently on to the slide-screen in catalogue form, so that the screen can be used stationarily, e.g. in display windows, or mobilely, e.g. in vehicles, to produce a very good advertising effect.

Furthermore, the slide-screen is fitted with, or can be subsequently fitted with, a mirror on the projector side which can swivel upwards, by means of which deflected projection is possible, since the mirror can be set at an angle to the viewing screen in a quick and simple manner.

In addition, the slide-screen has on the projector side several panels, preferably one to each side of the frame, which panels are also mounted on the frame so that they can swivel, or can be subsequently mounted, so that a shaft for projection results from the swivelled up panels, and by this means the slide-screen is structured as a box. These panels and the mirror, when not in use, can respectively be swivelled flat against the frame.

The deflected projection by means of the mirror, and the box structure obtained by means of the folding panels, represent further solutions to the problem for a versatile employment of the slide-screen, which can be extended expediently by these parts as build-on kits, and which will as a result grow in usefulness.

BRIEF DESCRIPTION OF THE DRAWINGS

Some embodiments of the invention, by way of example are hereinafter described in detail with reference to the accompanying drawings, wherein:

FIG. 1 is a perspective view of a slide-screen;

FIG. 2 is a vertical section through a slide-screen with flat viewing screen and convexly curved translucent partition;

FIG. 3 is a vertical section through a slide-screen with flat viewing screen and concavely curved translucent partition;

FIG. 4 is a vertical cross-section through part of a slide-screen and the frame containing the translucent partition;

DESCRIPTION OF THE PREFERRED EMBODIMENT

Figure 5:
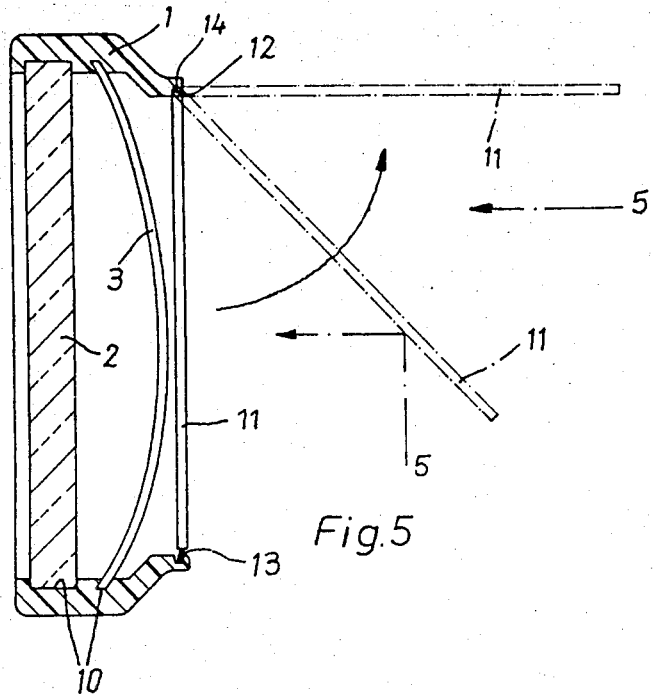
FIG. 5 is a vertical section through a slide-screen with a mirror.

The slide-screen for back projection has a standing or suspended frame 1, in which a projection surface is arranged. This projection surface is double-skinned and consists of a natural or synthetic glass viewing screen 2 on the front, and a naturally rigid, or flexible or elastic translucent partition 3 behind.

The glass screen 2 is made flat or curved, either concave or convex. The translucent partition 3 is also curved, the curvature being fixed by the manufacturer, or being produced by the user and moreover with the size of curvature being adjustable.

The light rays 5 coming from a projector 4 first impinge on the curved translucent partition 3 and penetrate the latter, so that the rays 5 fall on the flat or curved viewing screen 2, on which the picture then appears visible.

The light rays 5 impinging on the viewing screen 2, while avoiding dissipation of light and utilising all the residual light, are reflected on to the curved translucent partition 3, so that the entire radiation of light is utilised to produce an optimum picture, the residual light is accumulated on the picture.

The natural glass or plastic screen 2 is glass clear, whitish or tinted.

The translucent partition, which is curved at least in the lateral and height directions and preferably in all directions, consists of a matt (milky) plastics or some other suitable material.

For the embodiment of the translucent partition 3 as a naturally rigid sheet section, the latter is premoulded in its curvature and consequently has an enduring curvature.

This translucent partition 3 can be curved convexly against the light rays (cf. FIG. 2) and it can also be made concavely curved in the direction of the rays 5 (cf. FIG. 3). The same effect of complete utilisation of the light arises in both curvature embodiments.

If the translucent partition 3 consists of a flexible and/or elastic plastics foil, the curvature is produced by means of compressed air or a vacuum. In doing so the foil 3 is hermetically closed with the screen 2 in the frame 1, and compressed air is introduced, or a vacuum is raised, in the space 6 between screen 2 and translucent partition 3, for which purpose the frame 1 is fitted with an appropriate valve 7.

The embodiment of slide-screen according to Fig. 2 has a convexly curved translucent partition 3, the curvature of which arises in every direction of the foil as a result of introducing compressed air through valve 7, since this compressed air presses the foil 3 away from the viewing screen 2, and the compressed air determines and maintains the deformation of the translucent partition 3.

The embodiment of slide-screen according to FIG. 3 has a concavely curved translucent partition 3 the deformation of which, in the direction of viewing screen 2, is produced by raising a vacuum in space 6, to which a vacuum-producer is connected at valve 7.

When the slide-screen is not in use, the compressed air or the vacuum can be released through the valve 7, so that the translucent foil 3 returns to its initial flat position. In doing so, for the embodiment according to FIG. 2, an extremely flat slide-screen is produced, since the foil 3 almosts rests against the viewing screen 2, and the frame 1 is narrow, having a small depth.

The frame 1 can be made of metal, such as aluminium and formed from a U-section which, with its U-legs as holding lips, overlaps the viewing screen 2 and the translucent partition 3; the frame keeps both parts 2,3 hermetically sealed outwardly.

There is also the option of making the frame 1 out of a plastic frame (cf. FIG. 4), the viewing screen 2 and translucent partition 3 being laid in a mould or in the metal frame 1, and the space between frame 1 and the two projection parts 2 and 3 being filled up with plastics, to produce an intimate and tight joint between plastics frame 1, viewing screen 2 and translucent partition 3. The frame 1 may be fitted at the top with suspension eyes (not shown), or at the bottom with stand feet 9 which swivel about vertical spindles 8, the feet when not in use being swivelled into the plane of the frame, consequently being no wider than the frame 1.

A directional projector 4 is used for projection. Back projection with the slide-screen can be carried out in darkened as well as in undarkened rooms.

Between the two partitions 2, 3 a light-inhibiting material e.g. foam plastic in matt, tinted or white coloring, may be installed in the space 6, as a result of which the light rays are darkened or brightened, by which means yet another improved utilisation of the light rays is arrived at.

The slide-screen may be made in different sizes (width times height).

As FIG. 5 shows, the frame 1 is made of plastics and accommodates in sealed manner in grooves 10 the glass viewing screen 2 and the translucent partition 3. There is pivotably hinged at frame 1 adjacent to translucent partition 3, a mirror 11 which when at an angle of 45° makes possible the deflection of the light rays 5 (cf. the angled course of the light rays), and which at an angle of 90° is put out of action and then permits back projection (cf. the straight course of the light rays.).

This mirror can swivel about a hinge 12 on the frame and can be swung against the frame 1 parallel to the glass viewing screen 2, being retained by a locking device 13, such as a retaining bar, on the frame 1, and consequently covering the translucent partition side of the frame (cf. solid lines in FIG. 5). For the journalling of the mirror, the frame 1 is grooved at 14 and the hinge 12 of the mirror is inserted and secured in this groove. The locking device 13 also engages releasably in the latter.

Figure 6:
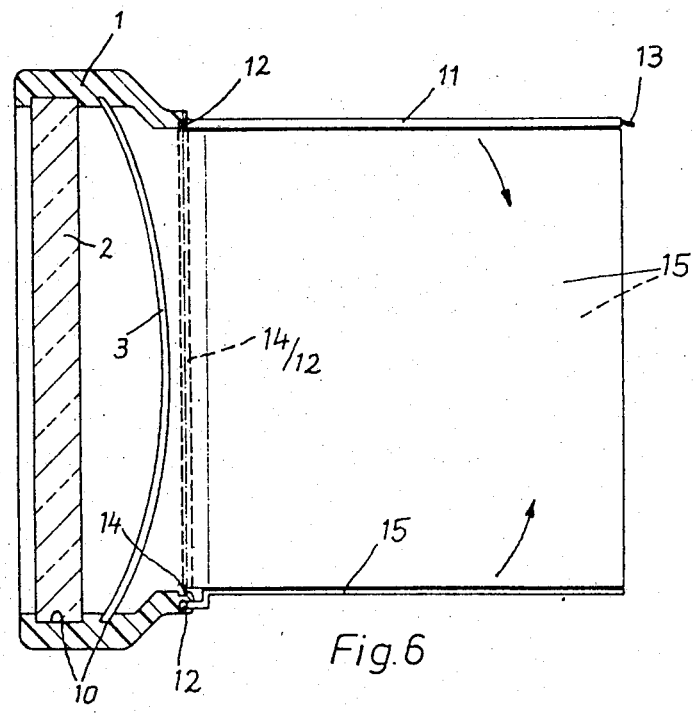
FIG. 6 is a vertical section through a slide-screen structured as a box.

According to the further embodiment as in FIG. 6, the slide-screen is structured as a box. The frame is structured as in FIG. 5 and is also fitted with a mirror 11 which extends from one side of the frame. The three other peripheral sides of the frame also each have a hinged partition 15, so that by opening up the three partitions 15 and the mirror 11 through 90° in each case, a peripherally sealed shaft 16 is formed for back projecting. The three partitions 15, and the mirror 11 are each held by a hinge 12 in the peripheral groove 14 of the frame 1. The three partitions 15 can be folded down flat together with the mirror 11, so that they lie together flatly as a partition package and run parallel to the viewing screen 2 on the side of the frame next to the translucent partition 3.

The opened position of all partitions 11,15 is shown in FIG. 6.

Instead of mirror 11, the frame 1 may be fitted only with partitions 11,15 which are in each case connected to a frame side, consist of non-translucent material, and make the slide-screen into a box.

The mirror and the hinged partitions 15 may be fitted to the frame subsequently so that the latter can, if required, also be used for deflected projection and be fitted out as a box. These partitions 11,15 may also be removed and installed at any time.

I claim:
1. In a slide-screen for back projection, having a frame and a projection surface arranged within said frame, the improvement which comprises that the projection surface is double-skinned and consists of:
   (i) a curved translucent partition which lets through light rays coming from a reflector, and
   (ii) a natural or synthetic glass viewing screen which reflects the impinging light rays in the direction of the translucent partition while preventing the dissipation of light.
2. A slide-screen, according to claim 1, wherein the translucent partition is made convexly curved outwards towards the light rays.
3. A slide-screen, according to claim 1, wherein the translucent partition is concavely curved inwards in the direction of the light rays.
4. A slide-screen, according to claim 1, wherein the partition is curved in all directions.
5. A slide-screen, according to claim 1, wherein the translucent partition is a rigid pre-moulded, curved sheet section.
6. A slide-screen, according to claim 1, wherein the translucent partition consists of a flexible or resilient foil which can be deformed by means of differential air pressure.
7. A slide-screen, according to claim 6, wherein the convexly curved translucent partition foil is held deformed by means of compressed air or vacuum introduced between it and the viewing screen.

8. A slide-screen, according to claim 7, wherein the frame is fitted with a valve for introducing compressed air into or raising a vacuum in a space between viewing screen and translucent partition foil.

9. A slide-screen according to claim 8, wherein the viewing screen and the translucent partition are sealed in the frame.

10. A slide-screen, according to claim 1, wherein the viewing screen is flat.

11. A slide-screen, according to claim 1, wherein the viewing screen is curved.

12. A slide-screen, according to claim 1, comprising between the viewing screen and the translucent partition a matt, tinted or white colored light-inhibiting material such as a foam material, which darkens or brightens the light rays.

13. A slide-screen according to claim 1, wherein, on the frame adjacent to the translucent partition, there is removably hinged a pivotable mirror for deflected projection.

14. A slide-screen, according to claim 1, wherein, on the frame adjacent to the translucent partition, there are removably hinged a plurality of partitions which can be opened up to make the slide-screen into a box, and which when not being used can be folded together as a package, running along the frame parallel to the viewing screen.

15. A slide-screen, according to claim 14, wherein one of the box partitions consists of the mirror.

16. A slide-screen, according to claim 14, wherein the frame is provided with a peripheral groove for removably securing hinges of the mirror and the partitions, as well as the locking devices of the partitions when folded against the frame.

* * * * *